United States Patent
DeLuca, Jr.

(10) Patent No.: US 6,706,109 B2
(45) Date of Patent: Mar. 16, 2004

(54) OPTICALLY VARIABLE INTERFERENCE PIGMENTS

(75) Inventor: Carmine V. DeLuca, Jr., Peekskill, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/143,781

(22) Filed: May 14, 2002

(65) Prior Publication Data
US 2003/0213409 A1 Nov. 20, 2003

(51) Int. Cl.$^7$ ................................. C04B 14/20
(52) U.S. Cl. .................. 106/415; 106/417; 106/418; 106/430; 106/436; 106/439
(58) Field of Search .................. 106/415, 417, 106/418, 430, 436, 439

(56) References Cited

U.S. PATENT DOCUMENTS

| | | | |
|---|---|---|---|
| 3,087,828 A | | 4/1963 | Linton |
| 3,087,829 A | | 4/1963 | Linton |
| 3,438,796 A | | 4/1969 | Hanke |
| 4,192,691 A | | 3/1980 | Armanini |
| 5,611,851 A | * | 3/1997 | DeLuca et al. ............ 106/415 |
| 5,624,486 A | | 4/1997 | Schmid et al. |
| 6,485,556 B1 | * | 11/2002 | DeLuca, Jr. ................ 106/415 |

* cited by examiner

Primary Examiner—C. Melissa Koslow
Assistant Examiner—Shalie Manlove
(74) Attorney, Agent, or Firm—Melanie L. Brown

(57) ABSTRACT

Optically variable interference pigments are composed of platelets of at least partly core-free titanium dioxide-coated substrate of about 1–25 mm particle size and an interference thickness of about 5–600 nm which have an oxide coating thereon.

24 Claims, No Drawings

OPTICALLY VARIABLE INTERFERENCE PIGMENTS

BACKGROUND OF THE INVENTION

Nacreous pigments, also known as pearlescent or effect pigments, exhibit pearl-like and/or iridescent effects upon the transmission and reflection of light therethrough. As is well known in the art, the characteristics of such pigments depends upon optical interference phenomena as more fully described, for example, in "The Properties of Nacreous Pigments", Greenstein and Miller, Technical Papers, Vol. XIII, Annual Technical Conference, Society of Plastic Engineers, May 1967.

Numerous patents and publications have described effect pigments based on titanium dioxide coatings on various substrates. Early examples include Linton U.S. Pat. No. 3,087,828 and 3,087,829 which describe the preparation of titanium dioxide and other metal oxide coated mica effect pigments, which optionally can be topped with a layer of another material such as, inter alia, iron. Since that time, numerous patents and publications have described the overcoating of titanium dioxide-coated mica to form a variety of effect pigments.

Recently, there has been renewed interest in a type of effect pigments known as "optically variable" because they exhibit different colors at different viewing angles, i.e., they exhibit color travel or "flop" as the angle of viewing changes. Such optically variable pigments have been described in the patent literature since the 1960s. For instance, Hanke in U.S. Pat. No. 3,438,796 describes the pigment as being "thin, adherent, translucent, light transmitting films or layers of metallic aluminum, each separated by a thin, translucent film of silica, which are successively deposited under controlled conditions in controlled, selective thicknesses on central aluminum film or substrate". These materials are recognized as providing unique color travel and decorative optical color effects.

The recent approaches to optically variable pigments have generally adopted one of two techniques, both of which are designed to position a low refractive index layer such as silica (Rf 1.5) between reflective layer. In the first, a stack of layers is provided on a temporary substrate which is often a flexible web. The layers are generally made up of aluminum, chromium, magnesium fluoride and silicon dioxide. The stack of film is separated from the substrate and subdivided into appropriately dimensioned flakes. The pigments are produced by physical techniques such as physical vapor deposition onto the substrate, separation from the substrate and subsequent comminution or by other deposition techniques (plasma, sputtering etc.), subsequent deflaking of the decomposition product, etc. In the pigments obtained in this way, the central layer and all other layers in the stack are not completely enclosed by the other layers. The layered structure is visible at the faces formed by the process of comminution.

In the other approach, a platelet shaped opaque metallic substrate is coated or encapsulated with successive layers of selectively absorbing metal oxides and non-selectively absorbing layers of carbon, metal sulfide, metal and/or metal oxide. To obtain satisfactory materials using this approach, the layers are applied by multiple techniques such as chemical vapor deposition and/or sol-gel processes. A major shortcoming of this is that traditional metal flakes usually have structural integrity problems, hydrogen outgassing problems and other pyrophoric concerns.

The prior art approaches suffer from additional disadvantages. For instance, certain metals or metal flakes such as chromium, aluminum, copper, brass and bronze may have perceived health and environmental impacts associated with their use.

New optically variable effect pigment which do not suffer from the disadvantages of the prior art are clearly desirable and it is the object of the present invention to provide the same.

SUMMARY OF THE INVENTION

This invention is related to new articles exhibiting optically variable color and high reflectivity and their preparation. More particularly, the invention relates to a platelet pearlescent pigment having an oxide coating on titanium dioxide-coated substrate platelets from which a portion of the substrate has been eliminated.

DETAILED DESCRIPTION OF THE INVENTION

The optically variable effect pigments of the present invention are oxide-coated, for instance, iron oxide-coated, titanium dioxide platelet pigments from which a portion of the interior of the titanium dioxide has been removed. These titanium dioxide platelet pigments are derived from titanium dioxide-coated siliceous (e.g., mica) substrates from which a portion of the substrate has been removed. The formulation of coating and other compositions containing the resulting pigments and the coating of substrates is known.

Appropriately sized titanium dioxide platelets commonly referred to as "platy $TiO_2$" or "self supporting $TiO_2$" are described, for instance, in U. S. Pat. No. 4,192,691 and 5,611,851. Such platelets are substantially substrate free, generally containing less than about 20% of substrate based on the total weight of the product. U.S. Pat. No. 4,192,691 employs an aqueous solution of hydrofluoric acid and a mineral acid such as sulfuric acid to dissolve the mica from the pigment. It also discloses and illustrates the use of this dissolving agent to remove the mica from a titanium dioxide-coated mica having a surface layer of either iron or chromium oxide. U.S. Pat. No. 5,611,851 employs a combination of a mineral acid and phosphoric acid followed by an extractive dissolution using an alkali. Although the procedure of U.S. Pat. No. 5,611,851 is preferred, other procedures can be employed to obtain the titanium dioxide platelets used in the present invention. Titanium dioxide platelet types suitable for use in this invention can be prepared by removing gypsum from $TiO_2$ coated gypsum or by burning off graphite from $TiO_2$ coated graphite. Dissolving glass from a $TiO_2$ coated glass base also provides a substrate useful in this invention. Although there are several avenues for preparing the $TiO_2$ platelets which then can be coated further, the $TiO_2$ substrate of U.S. Pat. No. 5,611,851 is still preferred in order to obtain maximum reflectivity and color purity. Initially using a substrate aids in producing the relatively smooth and regular titanium dioxide surfaces needed to achieve high quality effect pigments, and the subsequent removal of the mica (refractive index 1.5) or other substrate and its replacement with air (Rf 1.0), allows the benefit of the refractive index of $TiO_2$ (2.6–2.9) to be more fully realized.

The platy $TiO_2$ pigments exhibit little, if any, color travel and cannot be considered optically variable. Surprisingly, however, it was discovered that when the average particle size (longest dimension measured by SEM) was limited, oxide overcoating produced a sharp and distinct color travel.

Accordingly, the platelets of titanium dioxide used in the present invention generally have an average longest dimension of about 1–25 $\mu m$, preferably about 2–15 $\mu m$ and more preferably about 5–8 $\mu m$. The platelets can have a thickness of about 5–600 nm, and is more preferably about 20–400 nm. The $TiO_2$ is preferably in the rutile crystalline form but can also be in the anatase form.

While the use of platelets which are substantially substrate free, i.e., generally containing less than about 20% of substrate based on the total weight of the product, provides optically variable effect pigments, the need to eliminate so much of the substrate adds to the manufacturing cost. Also, because the center of the platy $TiO_2$ is essentially hollow, the pigment tends to be more fragile which, in turn, tends to complicate its use in applications where the pigment is subjected to more rigorous conditions. However, it has been found that the titanium dioxide need not be substantially substrate free, and platelets where only a part of the core substrate has been eliminated gives similar results while reducing manufacturing cost and making the pigment more sturdy, allowing it to be employed in more rigorous applications such as in automotive paints.

Accordingly, the platelets used in the present invention are at least partially core (substrate) free, in that at least about 30% of the substrate core has been removed. The platelets may be substantially substrate free but are preferably partly core-free. By partly core-free is meant that about 30 to 60% of the mica or other siliceous substrate in the platelet has been removed. When no substrate has been removed, its content is dependent on the thickness of the $TiO_2$ and generally constitutes about 40–90%, and more often about 60–80%, of the total weight. The amount of substrate after removal based on the total weight of the platelet will thus always be less than about 63%, and more usually less than about 56%. In the case of the preferred partly core-free platelets, the substrate is most usually about 24–50% based on the total weight of the platelet.

The intermediate product produced in the process disclosed in U.S. Pat. No. 5,611,851, i.e., the partly core-free platelet product realized before the alkali extractive dissolution, is very useful in the present invention and is preferred. In this procedure, any $TiO_2$-coated substrate effect pigments known heretofore is subjected to an acid extractant which is a combination of phosphoric acid and one or more mineral acids such as sulfuric acid, hydrochloric acid and nitric acid. In general, the acid solution can contain up to about 20% of the phosphoric acid, for instance about 1%–20%, preferably about 10%–15%, and up to about 35% of the mineral acid, for instance 5–35% and preferably about 25%–30%. The ratio of mineral acid to phosphoric acid can vary over a wide range of from 10:1 to 1:10 but preferably the mineral acid is present in excess such that the ratio is greater than about 1:1 up to about 3:1. In the case of a mica substrate, the extractive dissolution is continued until the desired degree of aluminum and potassium components of the mica have been removed which can take as short a period of time as ¼ of an hour to as long as 20 hours or more, preferably about 4 to 8 hours. Preferably, substantially all of the Al and K is removed, i.e., possibly only trace amounts remain. The extractive dissolution can be carried out at any convenient temperature such as those from about 20 to 150° C. As a general rule, the higher the temperature, the faster the dissolution. Preferably, the extractive dissolution takes place at reflux. Before being overcoated, the partly core-free platelets can be separated from the reaction mixture in which they were prepared in any convenient fashion, such as by hot or cold filtering, and then washed and dried.

The methods used to provide the at least partially core-depleted titanium dioxide-coated substrate platelets with various surface layers, such as iron oxide or other oxides having a refractive index of about 1.5–2.5 (Si, Sn, Cr, etc.), is well known. In broad terms, the material to be coated is brought into contact with a salt of the metal, usually an aqueous solution thereof, under appropriate conditions, e.g. pH, so as to deposit a layer of hydrous metal, followed by calcination which results in formation of oxide(s). The present invention utilizes such known procedures but differs therefrom with respect to the titanium dioxide platelet used as the material to be coated. In general, the oxide overcoating will constitute about 4–20%, preferably about 4–10%, of the final calcined product.

The overcoated oxide may be inherently colorless such as alumina, zirconium oxide, zinc oxide, tin oxide, antimony oxide or even an additional layer of titanium dioxide, or may be inherently colored such as iron oxide, nickel oxide, cobalt oxide, copper oxide or chromium oxide, or may be a mixture of various oxides. Further overcoatings also known in the art can be present.

Compared to prior art, the process of the present invention has several advantages. It allows color variable effect pigments to be made employing standard, pearlescent coating technology without resorting to organic solvent based reactions or chemical vapor deposition/reduction techniques, it takes full advantage of the high refractive index of $TiO_2$ (2.6–2.9), it does not require costly or impractical equipment, and it produces a full range of colors which can be used in cosmetic/automotive/industrial markets.

The following examples are set forth in order to further illustrate the invention without being intended to limit it. Throughout the specification and claims, all parts and percentages are by weight and all temperatures and degrees are centigrade unless otherwise indicated.

EXAMPLE 1

One hundred thirty grams of a red interference $TiO_2$ coated mica (average particle size 6 μm) was treated with an acid dissolution step as described in U.S. Pat. No. 5,611,851, followed by filtering to recover the platelets thus prepared, washing and drying to prepare approximately 110 grams of a red interference $TiO_2$ platelets from which about 70% of the original mica core remained. Forty grams of the platelets were then slurried in 1 liter of deionized water and heated to 74° C. At that temperature, the pH was adjusted to 3.5 with 1:1 HCl. Then, 15 ml of 39% aqueous $FeCl_3$ was added at a rate of 1 ml/min, until a violet interference thickness product was realized. The slurry was filtered, and the resulting presscake was washed and calcined at 850° C. for ½ hr. The resulting product had a red-violet reflection color at the specular viewing angle which flopped (changed) to a gold color at a diffuse viewing angle.

EXAMPLE 2

The procedure of example 1 was repeated except that the initial $TiO_2$ coated mica treated with acid had a violet interference color and the iron coating was continued until a purple interference thickness product was realized. The resulting product had a purple reflection color at the specular viewing angle which flopped to an orange color at a diffuse viewing angle.

EXAMPLE 3

The procedure of example 1 was repeated except that the initial $TiO_2$ coated mica treated with acid had a blue interference color and the iron coating was continued until a green interference thickness product was realized. The resulting product had a green reflection color at the specular viewing angle which flopped to a red color at a diffuse viewing angle.

EXAMPLE 4–5

Two red interference $TiO_2$-coated mica of different average particle size (5–6 and 16–18 μm) were treated to the acid/alkali dissolution steps of example 1 in U.S. Pat. No. 5,611,851, followed by filtering to recover the platelets thus prepared, washing and drying. The different sized platelets were separately slurried in 1 liter of deionized water and heated to 74° C. At that temperature, the pH was adjusted to 3.5 with 1:1 HCl. Then, 15 ml of 39% aqueous FeCl₃ was added at a rate of 1 ml/min, until a violet interference thickness product was realized. The slurries were filtered, and the resulting presscakes was washed and calcined at 850° C. for ½ hr. The resulting smaller particle size product had a red-violet reflection color at the specular viewing angle which flopped (changed) to a gold color at a diffuse ("flop") viewing angle. The resulting larger particle size product also had a red-violet reflection color at the specular viewing angle but exhibited no significant change in color when viewed at a diffuse angle.

EXAMPLE 6

Example 1 is repeated except that the platelets were coated with 5% tin instead of iron. The calcined product had a red-violet reflection color at the specular viewing angle which flopped to an orange-red color at a diffuse viewing angle.

EXAMPLE 7

Example 1 is repeated except that the platelets were coated with 10% SiO₂ instead of iron. The calcined product had a red-violet reflection color at the specular viewing angle which flopped to an orange color at a diffuse viewing angle.

EXAMPLE 8

Example 2 is repeated except that the platelets were coated with 4–6% Cr₂O₃ instead of iron. The calcined product had a violet-purple reflection color at the specular viewing angle which flopped to a red-orange color at a diffuse viewing angle.

EXAMPLE 9

The pigment of this invention can be formulated into a powder eye shadow by thoroughly blending and dispersing the following materials:

| Ingredients | wt parts |
| --- | --- |
| Mearltalc TCA ® (Talc) | 18 |
| Mearlmica ® SVA (Mica) | 20 |
| Magnesium Myristate | 5 |
| Silica | 2 |
| Cloisonné ® Red 424C (red TiO₂-coated mica) | 20 |
| Cloisonné ® Violet 525C (violet TiO₂-coated mica) | 13 |
| Cloisonné ® Nu-Antique Blue 626CB (TiO₂-coated mica/iron oxide-coated mica) | 2 |
| Cloisonné ® Cerise Flambé 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne Red 424C and 5 parts of the pigment of this invention added and mixed until a uniform powder eye shadow is obtained.

EXAMPLE 10

The pigment can be formulated into a lipstick by placing the following amounts of the listed ingredients into a heated vessel and raising the temperature to 85±3° C.:

| Ingredients | wt parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| Aloe Vera | 1.00 |
| Castor Oil | 37.50 |
| Red 6 Lake | 0.25 |
| Tocopheryl Acetate | 0.20 |
| Phenoxyethanol, Isopropylparaben, and butylparaben | 1.00 |
| Antioxidant | q.s. |

A mixture of 13 parts of the pigment of this invention and 1 part of kaolin are added and mixed until all of the pigment is well dispersed. Fragrance is added as desired and mixed with stirring. The resulting mixture is poured into molds at 75±5° C., allowed to cool and flamed into lipsticks.

Products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic field, these pigments can be used in the eye area and in all external and rinse-off applications. Thus, they can be used in hair sprays, face powder, leg-makeup, insect repellent lotion, mascara cake/cream, nail enamel, nail enamel remover, perfume lotion, and shampoos of all trpes (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble -bath, body lotion (moisturizing, cleansing, analgesic, astringent), after shave lotion, after bath milk and sunscreen lotion.

For a review of cosmetic applications, see Cosmetics: Science and Technology, 2nd Ed., Eds: M. S. Balsam and Edward Sagarin, Wiley-Interscience (1972) and deNavarre, The Chemistry and Science of Cosmetics, 2nd Ed., Vols 1 and 2 (1962), Van Nostrand Co. Inc., Vols 3 and 4 (1975), Continental Press, both of which are hereby incorporated by reference.

Various changes and modifications can be made in the process and products of this invention without departing from the spirit and scope of the invention. The various embodiments which were disclosed herein (including the field of use disclosure) were intended to further illustrate the invention but not to limit it.

What as claimed is:

1. A color variable titanium dioxide effect pigment comprising at least partly substrate-free titanium dioxide-coated substrate platelets of about 1–25 $\mu$m in maximum dimension and an interference thickness of about 5–600 nm, said platelets having an oxide coating thereon.

2. The pigment of claim 1, wherein the platelets have a maximum dimension of about 2–15 $\mu$m, a thickness of about 20–400 nm and contain less than about 63% by weight substrate.

3. The pigment of claim 2, wherein the titanium dioxide is in the rutile crystalline form.

4. The pigment of claim 3, wherein the oxide coating comprises iron oxide.

5. The pigment of claim 4, wherein the platelets contain about 24–50% by weight substrate.

6. The pigment of claim 4, wherein the substrate is mica.

7. The pigment of claim 1, wherein the titanium dioxide is in the rutile crystalline form.

8. The pigment of claim 1, wherein the oxide coating comprises iron oxide.

9. The pigment of claim 8, wherein the platelets contain about 24–50% by weight substrate.

10. The pigment of claim 1, wherein the titanium dioxide is in the anatase crystalline form.

11. A method of preparing an optically variable titanium dioxide effect pigment comprising providing platelets of an at least partly substrate-free titanium dioxide-coated substrate platelets of about 1–25 $\mu$m in maximum dimension and an interference thickness of about 5–600 $\mu$m, depositing a hydrous metal layer on the platelets and calcining the hydrous metal-coated platelets.

12. The method of claim 11, comprising removing at least about 30% of the substrate from a said titanium dioxide-coated substrate platelets.

13. The method of claim 12, wherein the substrate is mica and about 30–60% of the mica is removed from the platelets.

14. The method of claim 13, wherein the mica is removed by subjecting the platelets to an extractive dissolution with a combination of phosphoric acid and a mineral acid.

15. The method of claim 14, wherein the hydrous metal is iron.

16. The method of claim 11, wherein the hydrous metal is iron.

17. In a paint or ink composition including a pigment, the improvement which comprises said pigment being a pigment of claim 1.

18. In a plastic composition including a pigment, the improvement which comprises said pigment being a pigment of claim 1.

19. In a cosmetic composition including a pigment, the improvement which comprises said pigment being a pigment of claim 1.

20. The pigment of claim 1 wherein said platelets contain 24 to less than about 63% by weight substrate.

21. The pigment of claim 20, wherein the platelets contain about 24–50% by weight substrate.

22. The pigment of claim 20, wherein said oxide coating comprises iron oxide.

23. The method of claim 11 wherein said titanium oxide-coated substrate platelets comprise 24 to less than 63% by weight substrate.

24. The new method of claim 23 wherein said titanium oxide-coated substrate platelets comprise 24–50% by weight substrate.

* * * * *